(No Model.)
C. P. STEINMETZ.
MOTOR METER.
No. 583,951. Patented June 8, 1897.
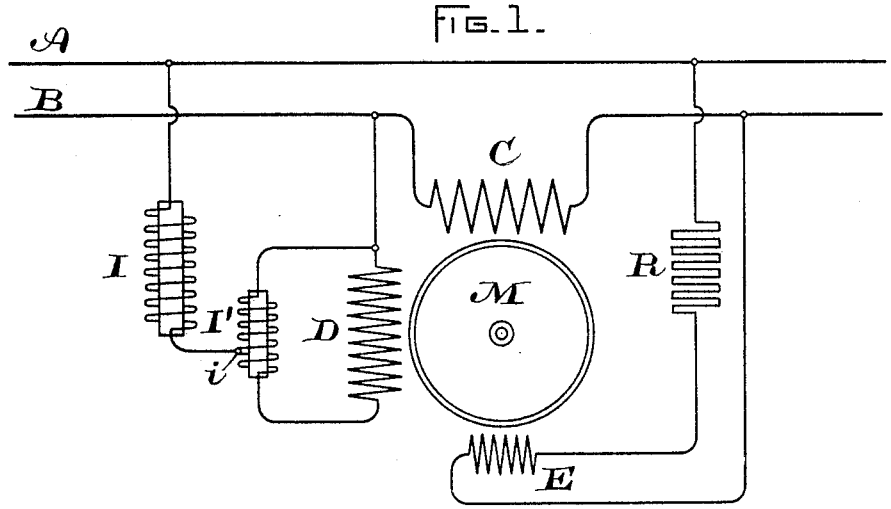
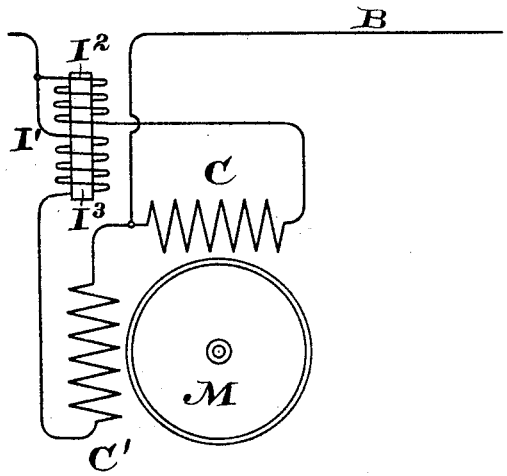
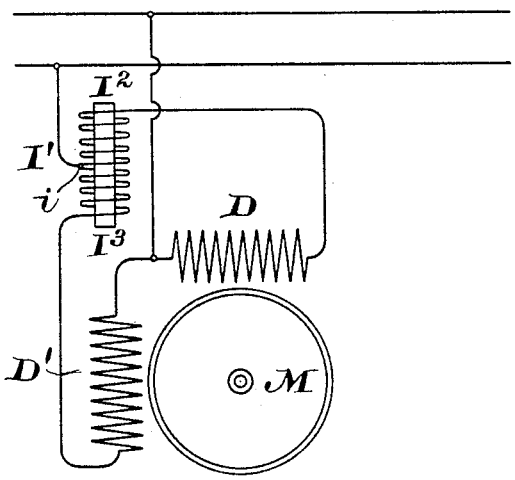
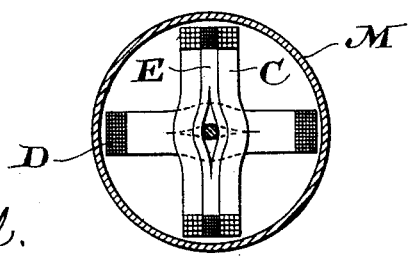
WITNESSES.
A. H. Abell.
A. T. Macdonald.
INVENTOR.
Charles P. Steinmetz,
Geo. R. Blodgett
atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

MOTOR-METER.

SPECIFICATION forming part of Letters Patent No. 583,951, dated June 8, 1897.

Application filed January 30, 1897. Serial No. 621,320. (No model.)

*To all whom it may concern:*

Be it known that I, CHARLES P. STEINMETZ, a citizen of the United States, residing at Schenectady, county of Schenectady, State of New York, have invented certain new and useful Improvements in Motor-Meters, (Case No. 429,) of which the following is a specification.

My invention relates to motor-meters, or more generally to motors which are particularly adapted for meters of the alternating-current type, and has for its object to provide a simple induction motor-meter arranged to efficiently record the consumption of energy in a wattmeter, of current in an ammeter, or of potential in a voltmeter. The particular type which I have illustrated is especially adapted to single-phase circuits, but it may be employed in circuits of other numbers of phases by suitable modifications well known in the art.

To adapt an induction-motor to the registration of energy on single-phase circuits, it is necessary that a two-phase effect should be obtained. This may be done in the wattmeter by combining a current-coil and a potential coil with inductance, capacity, and resistance in various relations to obtain the displacement required, but it is essential, in order to obtain accurate registration on inductive loads, that the displacement of phase between the current and shunt coils shall be exactly ninety degrees. Several different arrangements have been proposed for obtaining this, but the arrangement which I have devised is different from any with which I am familiar.

In general the motor consists of a short-circuited armature, which in the case of meters would be the usual drum or cylinder of metal of high electrical conductivity, such as aluminium or copper, the drum being mounted for rotation and having adjacent to it coils in which the alternating current flows. The arrangement of the coils varies according to the object of the motor, which will be described throughout in this application as one adapted to meters; but I do not mean to limit myself to that, inasmuch as the devices shown and claimed are useful for starting or running single-phase alternating-current motors or other types. In one arrangement of the motor, designed to measure current, or a recording ampere-meter I employ two current-coils connected in multiple with each other, but in series in one of the lines, together with a phase-displacing means. In another form, designed for a recording voltmeter, I connect the two coils in multiple across the lines and in series with the phase-displacing means. In the wattmeter form I employ a current-coil and a shunt-coil in the circuit of which the phase-displacing means is connected. The latter, which is an important feature of my invention and one which I particularly claim as novel, consists of a reactance of inductive character, having upon a single core coils which are wound to have a certain difference of effect. The construction may be a single coil wound in a given direction. The lead supplying current to the coil taps it at an intermediate portion of its length, so that the current flows in opposite ways through the two parts of the coil, or it may consist of two coils, in which the current flows in the same direction, but still upon the same core, so that they have a mutually inductive relation. In the lead to this regulating inductance I may insert another inductive reactance, serving to displace the phase of current in the shunt-coil to an approximation to ninety degrees, and the regulating inductance is then only of such an amount as is necessary to get exact quadrature, but I may dispense with the larger inductance and combine upon the single core the windings necessary to produce exact quadrature. By suitably proportioning the turns of the two coils in mutually inductive relation I may get any displacement of phase, from zero to opposition. Where the arrangement is employed in a wattmeter, I prefer to employ also a small auxiliary starting-coil to compensate for friction. This would ordinarily be connected across the mains, and its current would be in phase with the main line electromotive force. A non-inductive resistance is usually included in the circuit of the starting-coil to limit the amount of current consumed and to keep the current in phase with the electromotive force.

My invention is illustrated in some of its forms in the accompanying drawings, in which—

Figures 1, 2, and 3 are diagrams of circuits, and Fig. 4 is a sectional plan of a mechanical arrangement which may be employed.

In Fig. 1, which represents the arrangement needed in a wattmeter, A B are the mains. C is the current-coil in series in one of the mains. D is a shunt-coil coupled across the mains, the current in which is to be adjusted to quadrature with the main-line current. I is a reactance in series with the shunt-coil. I' is the auxiliary regulating inductance, consisting of an iron core upon which is wound a single coil. The lead from the inductance I is tapped into the coil upon I' at the point $i$, so that this latter winding forms in effect two coils having different numbers of turns, part being in shunt around the shunt-meter coil and part being in series with it. The counter electromotive forces and current induced in the local circuit, including the regulating inductance and shunt-coil D, by the current flowing through the two branches of the coil I', combine with the electromotive force and current impressed on the shunt-circuit from the mains A B, so as to create a difference of phase between the currents in the two branches of the divided circuit. By properly proportioning the windings of the regulating inductance this difference of phase may be made greater or less, as desired. For example, assume that in the wattmeter of Fig. 1 the current in the series coil C is substantially in phase with the electromotive force in the main circuit and that the current in the shunt-circuit is lagged by the inductance I eighty-five degrees behind the electromotive force. Thus to obtain the desired ninety degrees difference of phase between the series and potential magnetisms the windings of the phase-regulating inductance I' would be so proportioned as to lag the current in the branch passing through D a still further amount sufficient to make up the total of ninety degrees, and of course in so doing the current in the second branch shunting-coil D would be advanced. Hence since by the phase-regulating inductance I' it is possible to establish a desired difference of phase between the currents in the two branch circuits it is possible, in accordance with laws well understood by electricians, to adjust such a device to produce desired results in various combinations when the control of phase in a circuit or circuits is a desideratum. E is the starting-coil, and R is a resistance in its circuit preserving the circuit in phase or nearly in phase with the electromotive force, while M is the closed circuited armature, consisting of a drum or cylinder of conducting metal, preferably non-magnetic in character.

In Fig. 2 I show the disposition of the circuits adapted to the measurement of current. Therein the parts are as before, except that there is no shunt-coil, and two current-coils C C' are provided, the currents in which are to be in quadrature or displaced by any desired definite angle. These coils will be arranged at different angles to the armature. As shown the axes of the coils are at right angles to one another. This displacement of phase is effected by winding the phase-regulating reactance I' with two coils $I^2$ $I^3$ upon the same core, but with different numbers of turns, so as to afford different electromotive forces, the effect being to displace the phase in the coil C' relative to that in coil C, as has been already explained.

In Fig. 3 the connections for a voltmeter are shown. They are identical with the connections shown in Fig. 2, except that the whole arrangement embracing the two shunt-coils D D' and the reactance I' is coupled across the mains.

In Fig. 4 I show a mechanical arrangement which may be adopted. Therein the coils C and D of Fig. 1 are arranged at right angles upon the inside of the drum M, and the starting-coil E is arranged parallel to the current-coil, so that there will always be a slight starting effect sufficient to overcome friction at small loads.

It is of course designed that the usual cooperating parts of the meter shall be employed—counting apparatus of any desired type, gearing for transmitting the movement of the drum, and the usual brake, frictional or magnetic; but none of these parts is illustrated, as they do not constitute any part of my invention and may be indefinitely varied.

What I claim as new, and desire to secure by Letters Patent of the United States, is—

1. An inductive device for obtaining a definite phase displacement between a circuit and a branch thereof, consisting of two windings having different numbers of turns inductively related upon a common core, said windings being included respectively in branches of the circuit.

2. An inductive device for obtaining a definite phase displacement between two branches of a circuit or two circuits, consisting of two windings having different numbers of turns upon a common core, and inserted respectively in the circuits or branches between which the phase displacement is to be produced.

3. An induction-motor device comprising two inducing circuits or coils in which currents in exact quadrature are to be maintained, an induced member in the field of the inducing-coils, and means for producing currents in quadrature in the two inducing-circuits; such means consisting of a core provided with two coils of different numbers of turns included in branches of a circuit magnetizing the motor.

4. An induction-motor meter comprising a drum of good conducting metal, and inducing-coils coöperating to induce current in the drum and thereby produce its rotation, the coils energized by current from a single-phase circuit, and one of the coils having in circuit with it an inductive device for displacing the phase of current in the energizing-coils by ninety degrees, the device consisting of coils of different numbers of turns inductively related upon a common core and included in branches of one of the energizing-circuits.

5. An induction-motor meter comprising a drum of good conducting metal, inducing-coils coöperating to induce current in the drum and thereby produce its rotation, the coils energized by single-phase current and one of the coils having in circuit with it an inductive device for displacing the phase of current therein to exactly ninety degrees, the device consisting of coils of different numbers of turns upon a common core, and an auxiliary starting-coil compensating for friction in the meter.

In witness whereof I have hereunto set my hand this 9th day of November, 1896.

CHARLES P. STEINMETZ.

Witnesses:
B. B. HULL,
M. H. EMERSON.